United States Patent
Kozlowski et al.

(10) Patent No.: US 8,986,818 B2
(45) Date of Patent: Mar. 24, 2015

(54) RECORDING MATERIAL FOR ELECTROPHOTOGRAPHIC PRINTING METHODS

(71) Applicant: Schoeller Technocell GmbH & Co. KG, Osnabrück (DE)

(72) Inventors: Christoph Kozlowski, Osnabrück (DE); Andreas Overberg, Osnabrück (DE)

(73) Assignee: Schoeller Technocell GmbH & Co. KG, Osnabrück (DE)

( * ) Notice: Subject to any disclaimer, the term of this patent is extended or adjusted under 35 U.S.C. 154(b) by 60 days.

(21) Appl. No.: 13/871,467

(22) Filed: Apr. 26, 2013

(65) Prior Publication Data

US 2013/0288040 A1  Oct. 31, 2013

(30) Foreign Application Priority Data

Apr. 27, 2012 (DE) .......... 10 2012 103 765

(51) Int. Cl.

| | |
|---|---|
| *B32B 3/00* | (2006.01) |
| *B32B 5/16* | (2006.01) |
| *B32B 7/00* | (2006.01) |
| *G03G 7/00* | (2006.01) |
| *B32B 27/08* | (2006.01) |
| *B32B 27/32* | (2006.01) |
| *B32B 27/10* | (2006.01) |
| *B32B 27/30* | (2006.01) |

(52) U.S. Cl.
CPC ............... *G03G 7/004* (2013.01); *B32B 27/08* (2013.01); *B32B 27/32* (2013.01); *B32B 27/10* (2013.01); *B32B 27/30* (2013.01); *G03G 7/0013* (2013.01); *G03G 7/0026* (2013.01); *G03G 7/0033* (2013.01); *G03G 7/0046* (2013.01)
USPC ............ 428/206; 428/323; 428/500; 428/688

(58) Field of Classification Search
CPC .......... B32B 5/16; B32B 27/08; B32B 27/10; B32B 27/30; B32B 27/32; B32B 27/36; B32B 33/00; G03G 7/004; G03G 7/0013; G03G 7/0026; G03G 7/0033; G03G 7/0046
USPC ................................. 428/206, 323, 500, 688
See application file for complete search history.

(56) References Cited

U.S. PATENT DOCUMENTS

| | | | |
|---|---|---|---|
| 2002/0136865 A1* | 9/2002 | Ogino et al. ................. | 428/195 |
| 2004/0013964 A1 | 1/2004 | Ogata | |
| 2007/0031615 A1* | 2/2007 | Nair et al. ................. | 428/32.38 |
| 2007/0237909 A1* | 10/2007 | McManus ................. | 428/32.34 |
| 2011/0005417 A1* | 1/2011 | Sukeda et al. ................ | 101/453 |

FOREIGN PATENT DOCUMENTS

| | | |
|---|---|---|
| DE | 102011078714 A1 | 1/2012 |
| EP | 2431809 A1 | 3/2012 |
| WO | 96/30811 A2 | 10/1996 |
| WO | 2004/018769 A1 | 3/2004 |

* cited by examiner

*Primary Examiner* — Betelhem Shewareged
(74) *Attorney, Agent, or Firm* — Honigman Miller Schwartz and Cohn LLP; Thomas A. Wootton; Johnathan P. O'Brien

(57) ABSTRACT

Described is a recording material for electrophotographic printing methods, which contains a carrier material and a toner-receiving layer containing a gloss pigment, and which is suitable for producing photo-like images with use of both dry toners and liquid toners.

15 Claims, No Drawings

RECORDING MATERIAL FOR ELECTROPHOTOGRAPHIC PRINTING METHODS

CROSS REFERENCE TO RELATED APPLICATION

This U.S. patent application claims benefit of German Application Serial No. 102012103765.5, filed Apr. 27, 2012, which is hereby incorporated by reference.

FIELD OF THE INVENTION

The invention relates to a recording material, with which images of photo quality can be produced by means of electrophotographic printing methods with liquid and dry toners.

BACKGROUND OF THE INVENTION

Laser printers are based on the principle of electrophotography. By means of imaging or illumination of a photoconductor with the optical image of an original, electrophotography produces a latent image from electrical charges, which will then be used to selectively apply a toner (development) and to image (copy) the original, for example onto paper. A distinction is made between direct and indirect as well as wet and dry electrophotography. The wet methods, also referred to as liquid toner methods, use a dispersion of the toner in an aliphatic solvent with low electric constant and as developer, whereas the dry method uses a powder toner. An image of the desired page is recorded onto the light-sensitive imaging drum with the aid of a bundled laser beam and a rotating mirror. The drum is initially charged negatively, wherein the charge is removed again at the points at which the laser beam impinges. The shape of the discharged areas on the drum corresponds to the subsequent printout. The toner is applied to the drum via a roller with negatively charged toner, which remains adhered to the discharged points on the imaging drum.

With the dry toner method, the paper is then guided over the imaging drum. It only touches the drum gently. A electrical field is formed behind the paper. The toner is transferred to the paper, where it adheres initially only loose. The toner is then fixed with the aid of a hot roll and under pressure. The drum is discharged and excess toner is removed therefrom.

With the liquid toner method, the toner suspension is initially transferred to a heated rubber cylinder, on which the carrier liquid is evaporated and the toner is plasticised. The toner image is then transferred to the recording sheet from this intermediate roll (intermediate drum).

The images produced with the aid of a laser printer should achieve a quality comparable to that of a photo. This includes properties such as gloss, stiffness, opacity, high resolution and image sharpness as well as good light fastness.

In the publication by HP (Hannelore Breuer): Printing Know-How: New HP Laser Papers of May 13, 2005, available at 41131.www4.hp.com/Backgrounder_Neue_Laser-Papiere.pdf (as of Aug. 31, 2010), multi-layer coated papers with an "open" pore surface on either side are described. However, images produced with use of such papers have a surface feel that is quite different from conventional silver halide images and a different surface gloss.

In order to come closer to the objective of photo-like quality, images produced electrophotographically are produced on carrier materials that have the surface feel and the appearance of a typical silver salt photo. DE 44 35 350 C1 describes an image receiver material for electrophotography, which comprises a base paper coated with thermoplastics and a toner receiver layer and also an antistatic rear layer. A disadvantage of this material is that it can be improved further with regard to the toner fixing and the behaviour in the printer. Furthermore, once an image has been printed, such materials sometimes show bothersome glossy spots, which are caused by the oil-like substances often used as separating agents in the toner formulations.

DE 10 2011 078 714 A1 describes recording materials with toner receiving layers, which contain fine inorganic particles and which have pores of a pore radius of from 100 nm or less. The application of such materials is restricted to liquid toner methods as is explained in the document. During further processing of the print outs on such porous materials, for example to obtain a photo book, the danger exists that the porous toner receiving layer breaks along the feather edge of the print out and, as a consequence, an undesired white line at is formed at the break line.

Further recording materials for electrophotographic methods are described for example in EP 0 789 281 B1, EP 1 115 559, JP 2006-215 494, JP 2007-188 055 and JP 2010-020 283.

SUMMARY OF THE INVENTION

The object of the invention is therefore to provide a recording material that can be printed at least from one side by using a liquid toner or a dry toner, has a good image quality comparable to that of a silver salt photo, and, besides good photoresistance and ozone resistance during storage, also has good feed and transport behaviour in the printer and is suitable for stacking.

This object is achieved by a recording material having a carrier material (support), at least one toner-receiving layer, which contains a gloss pigment having a particle size of at most 100 μm, and a water-dispersible and/or water-soluble binder.

Gloss pigments having a particle size distribution from 5 to 60 μm (measured by laser diffraction) are particularly well suited. In particular, gloss pigments that have an oil absorption value of from 60 to 120 g/100 g (measured in accordance with EN ISO 787-5) are well suited. The water soluble or water dispersible binder is present in the toner receiving layer, based on the mass of the pigment in the toner receiving layer, in an amount to enable a closed layer. Accordingly, the toner receiving layer is a porous free layer.

It has surprisingly been found that no additional electrically conductive substance is required, as is contained conventionally in the toner-receiving layer.

DETAILED DESCRIPTION OF THE INVENTION

The carrier material may be an uncoated base paper, a coated base paper (base paper provided with a pigment-containing layer), but is preferably a paper coated with a synthetic resin.

The toner-receiving layer may preferably additionally contain a water-soluble (meth)acrylic acid/acrylic acid ester copolymer and an electroconductive substance, wherein the electroconductive substance may be an electroconductive, fine oxide or an electroconductive polymer.

For the purposes of the invention, the term "base paper" is understood to mean an uncoated or surface-sized paper. In addition to pulp fibres, base paper may contain sizing agents such as alkyl ketene dimers, fatty acids and/or fatty acid salts, epoxidised fatty acid amides, alkenyl succinic acid anhydride or alkyl succinic acid anhydride, wet-strengthening agents such as polyamine-polyamide epichlorohydrin, dry-strengthening agents such as anionic, cationic or amphoteric polyamides or cationic starches, optical brightening agents, fillers, pigments, dyes, antifoaming agents and further auxiliary agents known in the paper industry. The base paper may be surface-sized. Sizing agents suitable for this purpose include, for example, polyvinyl alcohol or oxidised starch. The base paper can be produced on a Fourdrinier or Yankee paper machine (cylinder paper machine). The grammage of the base paper may be 50 to 250 g/m², in particular 80 to 180 g/m². The base paper can be used in uncompressed or compressed form (smoothed). Base papers with a density of 0.8 to 1.2 g/cm³, in particular 0.90 to 1.1 g/cm³, are particularly well suited. For example, leaf bleached kraft pulp (LBKP), needle bleached kraft pulp (NBKP), leaf bleached sulphite pulp (LBSP) or needle bleached sulphite pulp (NBSP) can be used as pulp fibres. Pulp fibres obtained from paper waste can also be used. The aforementioned pulp fibres can also be used in mixed form and can be mixed with portions of other fibres, for example synthetic resin fibres. However, pulp fibres made from 100% hardwood pulp are preferably used. The average fibre length of the unrefined pulp is preferably 0.6 to 0.85 mm (Kajaani measurement). Furthermore, the pulp has a lignin content of less than 0.05% by weight, in particular 0.01 to 0.03% by weight, based on the mass of the pulp.

For example, kaolins, calcium carbonate in its natural forms, such as limestone, marble or dolomite rock, Paris white, calcium sulphate, barium sulphate, titanium dioxide, talc, silica, aluminium oxide and mixtures thereof can be used as fillers in the base paper. Calcium carbonate with a particle size distribution with which at least 60% of the particles are smaller than 2 µm and at most 40% are smaller than 1 µm is particularly suitable. In a specific embodiment of the invention, calcite with a particle size distribution with which approximately 25% of the particles have a particle size of less than 1 µm and approximately 85% of the particles have a particle size of less than 2 µm is used.

In a specific embodiment of the invention, a pigment-containing layer can be arranged on the base paper. The pigment may be a metal oxide, silicate, carbonate, sulphide, or sulphate. Pigments such as kaolins, talc, calcium carbonate and/or barium sulphate are particularly well suited. A pigment having a narrow particle size distribution, with which at least 70% of the pigment particles are less than 1 µm in size is particularly preferred. The pigment-containing layer can be applied inline or offline by means of all coating assemblies conventional in paper production, wherein the coating amount is selected such that, after drying, the coating weight is 0.1 to 30 g/m², in particular 1 to 20 g/m², or 2 to 8 g/m² in a particularly preferred embodiment. In a preferred embodiment, the pigment-containing layer is applied by means of a size press or film press integrated within the paper machine.

In a preferred embodiment of the invention, the base paper or the coated base paper can be provided on either side with synthetic resin layers. The synthetic resin layers (synthetic resin layer on the front side and/or rear side) may preferably contain a thermoplastic polymer. In particular, polyolefins, for example low-density polyethylene (LDPE), high-density polyethylene (HDPE), polypropylene, 4-methylpentene-1 and mixtures thereof as well as polyesters, for example polycarbonates, are suitable for this purpose. In a specific embodiment of the invention, the thermoplastic polymer is a biologically degradable polymer and/or a polymer based on growing raw materials, such as a linear polyester, thermoplastic modified starch, or polylactic acid or a mixture of these polymers with one another or with other polymers.

In a further particularly preferred embodiment of the invention, the front-side and/or rear-side synthetic resin layer contains at least 40% by weight HDPE with a density of more than 0.95 g/cm³, in particular 60 to 80% by weight. A composition that consists of 65% by weight HDPE with a density of more than 0.95 g/cm³ and 35% by weight LDPE with a density of less than 0.935 g/cm³ is particularly preferred.

The synthetic resin layers may contain white pigments, such as titanium dioxide, and also further additives, such as optical brightening agents, dyes, and dispersants. In a specific embodiment of the invention, antistatically acting substances, in particular electrically conductive inorganic pigments, are added to the synthetic resin layers.

The application weight of the synthetic resin layers can be 5 to 50 g/m², in particular 5 to 40 g/m², but preferably 10 to 30 g/m². The synthetic resin layer can be extruded in one layer onto the base paper or the coated base paper, or can be coextruded in a number of layers. The extrusion coating process can be carried out with machine speeds up to 600 m/min.

In one embodiment of the invention, the synthetic resin layers can be applied symmetrically to both sides of the base paper, that is to say the synthetic resin layers on both sides of the base paper have the same composition and are identical with regard to the surface topography. In accordance with the invention, the surface of the synthetic resin layer may have roughness values Rz on both sides from 0.03 to 15 µm, depending on which image surface (glossy or structured/matt) is desired. The roughness Rz is determined by a Hommel surface tester according to DIN 4768.

In a further embodiment of the invention, of which the objective is a glossy recording material that can be printed on one side, the synthetic resin layer has a lower roughness on the side of the recording material that carries the toner-receiving layer and is intended for printing (front side) compared to the rear side. In this embodiment, the side of the synthetic resin layer intended for printing has roughness values Rz from 0.03 to 1.8 µm, whereas the synthetic resin layer arranged on the side not intended for printing has roughness values Rz from 12 to 15 µm.

The side of the carrier material intended for printing is coated with a toner-receiving coating solution that forms a toner-receiving layer once dry. In the specific embodiment of the invention, of which the objective is a recording material that can be printed on either side, the toner-receiving layer is applied to both sides of the carrier material.

The toner-receiving layer preferably contains at least one gloss pigment having a particle size of at most 100 µm, in particular 5 to 60 µm and an oil absorption from 60 to 120 g/100 g (measured in accordance with EN ISO 787-5), and a water-dispersible and/or a water-soluble binder.

In accordance with the invention, gloss pigments are understood to mean pigments with which gloss effects are produced by directed reflection and/or interference at highly refractive, plate-shaped pigment particles oriented in parallel. Here, the effect is dependent on the viewing angle.

All pigments having a plate-shaped transparent or non-transparent carrier material, of which the surface is coated by one or more metal oxide layers, can be used as a gloss pigment. Here, titanium dioxide, zirconium oxide, silicon dioxide, aluminium oxide, chromium oxide, cobalt oxide or iron oxides for example can be used as metal oxides. Mica, other layered silicates such as talc or kaolin, $SiO_2$ flakes, $TiO_2$ flakes or $Al_2O_3$ flakes are particularly well suited as carrier material. These gloss pigments are known and commercially obtainable for the most part, for example under the trade name IRIODIN® or Bi-Flair®.

The binder in the toner-receiving layer may be any binder conventional for paper coatings, although starch, polyvinyl alcohol, acrylates or copolymers of acrylates are preferably used with other monomers. Water-dispersible ethylene acrylic acid copolymers, in particular those with a melting range from 70 to 100° C., and water-soluble polymers such as polyvinyl alcohol (partly saponified or fully saponified), which can be used individually or in a mixture, are particularly preferred. The mixing ratio of ethylene acrylic acid copolymer/polyvinyl alcohol may be 10:1 to 1:1.

According to a preferred embodiment of the invention the binder is present in such an amount that the spaces between the gloss pigment particles in the toner receiving layer is completely filled. Accordingly the toner receiving layer is not a porous layer. It is free of pores. Free of pores in the sense of the invention means that the pore volume of pores smaller than 1 μm per square meter recording sheet in the toner receiving layer is less than 0.3 ml, preferably less than 0.2 ml or less than 0.1 ml (determined with mercury porosimetry; Mercury porosimter PASCAL 240 of the company PORO-TEC GmbH, Germany.

The gloss pigment and the binder can be used in a quantitative proportion of 5:95, preferably 40:60 to 60:40, wherein the amounts specified are based on the mass of the dried, toner-receiving layer. Particularly preferred is a mass ratio gloss pigment to binder in the toner receiving layer of from 10:90, in particular 20:80 to 80:20.

In a particularly preferred embodiment, the toner-receiving layer additionally contains a water-soluble (meth)acrylic acid/acrylic acid ester copolymer, of which the amount may be 2 to 12% by weight, preferably 4 to 6% by weight, based on the mass of the dried layer.

An additional electrically conductive substance does not have to be contained in the toner-receiving layer.

However in an alternative embodiment of the invention, the toner-receiving layer may contain such electroconductive substance.

The electrically conductive substance may be an electrically conductive polymer and/or an electrically conductive pigment.

Electroconductive (electrically conductive) polymers according to the invention may be those in which the electrical charge is transported in the form of ions, such as polystyrene sulfonic acid. However, polymers in which the electrical charge is transported in the form of electrons or defect electrons are preferred, for example polyanilines and polythiophenes. poly(3,4-ethylenedioxythiophene) (PE-DOT: PSS) doped with polystyrene acid, which for example is obtainable under the name CLEVIOS® or ORGACON®, is particularly preferred as a conductive polymer. If, in accordance with the invention, a polymer is used as an electroconductive layer in the toner-receiving layer, this can replace the water-soluble or water-dispersible binder in full or in part in a specific embodiment of the invention.

Conductive pigments in accordance with the invention may consist, inter alia, of metal powder or carbon. Oxides such as antimony oxide, tin oxide and indium oxide are preferred however, particularly preferably titanium dioxide or zinc oxide or mixed oxides of the elements antimony, indium, titanium, zinc or tin. The conductive pigments according to the invention preferably have a mean particle size of less than 1000 nm, particularly preferably less than 200 nm. If a conductive pigment is used as an electroconductive component, this may also simultaneously constitute the fine pigment of the toner-receiving layer in a preferred embodiment of the invention.

The amount of electrically conductive component in the toner-receiving layer is selected such that the surface resistance of the recording material is less than 15 log (ohm/cm), measured in accordance with DIN 53483. In accordance with the invention, it may lie in a range between 0 to 50% by weight, in particular 0.1 to 4.0% by weight, based on the mass of the dried layer.

In a further embodiment of the invention, the toner-receiving layer additionally contains anionic or non-ionic surface-active agents in an amount from 0.01 to 4.0% by weight, in particular 0.05 to 2.5% by weight, based on the dried layer.

The toner-receiving later may optionally also contain further auxiliary agents, for example fine pigments, dulling agents, dyes, crosslinking agents, lubricants, anti-blocking agents and other conventional additives.

In accordance with the invention, the fine pigment is a fine inorganic pigment, for example silicon dioxide, aluminium oxide, aluminium oxide hydrate, aluminium silicate, calcium carbonate, zinc oxide, tin oxide, antimony oxide, titanium dioxide, indium oxide or a mixed oxide of these oxides. In a particularly preferred embodiment, the fine pigment is zinc oxide, tin oxide, antimony oxide, titanium dioxide, indium oxide or a mixed oxide of these oxides. The fine pigments can be provided individually or as mixtures in the toner-receiving layer. The fine pigment in the toner-receiving layer preferably has a mean particle size of less than 1000 nm, in particular less than 200 nm. Pigments with a BET surface from 30 $m^2/g$ to 400 $m^2/g$ are preferred in particular. Pigments according to the invention can be obtained by the flame method or by wet-chemical precipitation methods.

The coating mass for forming the toner-receiving layer can be applied inline or offline by means of all coating assemblies conventional in paper production, wherein the amount is selected such that, once dry, the coating weight is at most 5 $g/m^2$, in particular 0.5 to 3 $g/m^2$, or is 1 to 2 $g/m^2$ in accordance with a particularly preferred embodiment. The coating compound can be applied as a stroke with the aid of a conventional coating machine integrated within the extrusion coating facility. For example, kiss-roll coating using three rolls, or a doctor blade device is particularly well suited for this purpose.

In a further embodiment of the invention, further layers such as protective layers or gloss-improving layers can be applied to the toner-receiving layer. The coating weight of such layers is preferably less than 1 $g/m^2$.

The following examples are used to further explain the invention.

EXAMPLES

Base Paper

A base paper was produced from eucalyptus pulp. For refinement, the pulp was refined as approximately 5% aqueous suspension (thick matter) with the aid of a refiner to a degree of refinement of 36° SR. The mean fibre length was 0.64 mm. The concentration of the pulp fibres in the thin matter was 1% by weight, based on the mass of the pulp suspension. Additives were added to the thick matter, such as cationic starch in an amount of 0.4% by weight, alkyl ketene dimer (AKD) as a neutral sizing agent in an amount of 0.48% by weight, wet-strengthening agent polyamine polyamide epichlorohydrin resin (Kymene®) in an amount of 0.36% by weight, and a natural $CaCO_3$ in an amount of 10% by weight. The specified amounts are based on the pulp mass. The thin matter, of which the pH value was set to approximately 7.5, was brought from the matter outlet to the screen of the paper machine, whereupon the sheets were formed with dewatering of the web in the screen part of the paper machine. The paper web was dewatered further in the press part to a water content of 60% by weight, based on the web weight. Further drying was carried out in the drying part of the paper machine by means of heated drying cylinders. A base paper with a grammage of 160 g/m² and a moisture of approximately 7% was produced. The material thus obtained was used for the subsequent synthetic resin coating in the extruder.

Carrier Material A

The surface of the base paper intended for printing (front side), after irradiation with a corona discharge, was coated in the conventional manner with a synthetic resin mixture of the following composition: 50% by weight of a low-density polyethylene (LDPE, d=0.923 g/cm³) and 50% by weight of a high-density polyethylene (HDPE, d=0.964 g/cm³). The coating process was carried out in a laminator (tandem extruder) at an extrusion rate of 250 m/min with the use of a cooling cylinder from BEP Service Technology, of which the surface had a mean Rz value of 1.2 µm and an Ra value of 0.2 µm (measured in accordance with DIN 4768). The surface of the cooling cylinder was produced by sand blasting or by blasting with another blasting material, and was chromium-plated. The coating weight was 30 g/m².

The side of the base paper opposite the side to be printed (rear side) was coated in the extruder with a polyethylene mixture formed of 30% by weight of a low-density polyethylene (LDPE, d=0.923 g/cm³) and 70% by weight of a high-density polyethylene (HDPE, d=0.964 g/cm³) with a coating weight of 30 g/m². The cooling cylinder was selected such that the resultant surface of the rear side had a roughness Rz of 15 µm (measured in accordance with DIN 4768).

Carrier Material B

The surface of the base paper intended for printing (front side), after irradiation with a corona discharge, was coated with a synthetic resin mixture as with carrier material A. The coating weight was 30 g/m². The coating process was carried out with the use of a cooling cylinder, of which the surface had a mean Rz value of 11.2 µm, measured in accordance with DIN 4768. The surface of the cooling cylinder was produced by sand blasting or by blasting with a different blasting material, and was chromium-plated.

The side of the base paper opposite the side to be printed (rear side) was coated with a polyethylene mixture as with carrier material A. The cooling cylinder was selected such that the resultant surface of the rear side had a roughness Rz of 15 µm (measured in accordance with DIN 4768). The coating weight was 30 g/m².

The carrier materials A and B were then coated on the front side, in each case with the toner-receiving coating colour a and b, and were dried. The coating amount of the coating colour was selected such that a dry coating of 3 g/m² was produced. The composition of the coating colours is specified below.

Coating Colour a 7.8 g of an aqueous ethylene acrylate dispersion MICHEM PRIME® 4990 R.E. (polymer content 35.7% by weight) and 3.1 g of a polyvinyl alcohol solution (Mowiol®40-88, polymer content 10% by weight) were mixed with 3.1 g of gloss pigment IRIODIN® 6103 (particle size: 5-40 µm, oil absorption 70-90 g/100 g, measured in accordance with EN ISO 787-5), 1 g of a dispersion of (meth)acrylic acid copolymer (Rheovis® AT 120, polymer content 30% by weight), 0.2 g of wetting agent Zonyl FSN®, and 84.8 g of water.

Coating Colour b

The coating colour was produced similarly to coating colour a, but a gloss pigment IRIODIN® 7205 (particle size: 10-60 µm, oil absorption 80 g/100 g, measured in accordance with EN ISO 787-5) was used.

Coating Colour c

The coating colour was produced similarly to coating colour a, but a gloss pigment IRIODIN® 100 (particle size: 10-60 µm) was used.

Coating Colour d

The coating colour was produced similarly to coating colour a, but a gloss pigment IRIODIN® 123 (particle size: 10-60 µm) was used.

Coating Colour e

The coating colour was produced similarly to coating colour a, but a gloss pigment Bi-Flair® 83 (particle size<25 µm) was used.

The recording materials obtained in accordance with the examples were subjected to the following described tests.

Surface Resistance

Measured using a comb electrode in accordance with DIN 53483, specified in log(ohm/cm).

Stick Test:

Two sheets of the carrier material of DIN-A4 size are placed one on top of the other at 23° C. and 50% RH and are loaded by a 10 kg weight. After 65 hours, the sheets are separated manually and the adhesion/stick is assessed.

+: no stick,
o: slight stick,
−: strong stick.

Toner Adhesion:

The recording materials are printed using an HP® Indigo® 6000 (liquid toner) and a KonicaMinolta® MC 5550 (dry toner) electrophotographic printer and the adhesion of the toner is assessed at 23° C./50% RH by sticking on and then removing an adhesive strip of the TESA 4104 type.

+: toner layer remains undamaged,
o: toner layer slightly torn off,
−: toner layer completely torn off from the carrier.

FLOP Index

The FLOP denotes the change in the colorimetric properties of a material at different viewing angles. The FLOP is determined at a number of measurement angles. It is then described by the colorimetric measured values of all measured angles. What is known as the FLOP index can be specified for the brightness flop. This is calculated from the brightness L* according to the CIELab system, measured at 5 measurement angles (15°, 25°, 45°, 75°, 110°). The measurements were taken with the aid of a 5-angle spectrophotometer (BYK-mac).

The test results are summarised in Table 1 below.

TABLE 1

| Recording material | Surface resistance | Stick test | Toner adhesion |
|---|---|---|---|
| Aa | 12.3 | + | +/+ |
| Ab | 12.0 | + | +/+ |
| Ac | 12.5 | + | +/+ |
| Ad | 12.3 | + | +/+ |
| Ae | 12.0 | + | +/+ |
| Ba | 12.5 | + | +/+ |
| Bb | 12.4 | + | +/+ |
| Bc | 12.4 | + | +/+ |
| Bd | 12.2 | + | +/+ |
| Be | 12.0 | + | +/+ |

| Recording material | L15° | L25° | L45° | L75° | L110° | FLOP |
|---|---|---|---|---|---|---|
| Aa | 133.61 | 102.44 | 80.27 | 75.5 | 76.12 | 4.87 |
| Ab | 124.07 | 98.64 | 83.4 | 79.37 | 77.7 | 3.71 |

TABLE 1-continued

| | | | | | | |
|---|---|---|---|---|---|---|
| Ac | 130.99 | 99.17 | 79.76 | 75.38 | 74.9 | 4.77 |
| Ad | 136.1 | 109.11 | 80.92 | 73.08 | 73.69 | 5.30 |
| Ae | 133.74 | 100.11 | 81.38 | 77.02 | 75.43 | 4.89 |
| Ba | 127.53 | 101.05 | 86.17 | 83.15 | 81.84 | 3.55 |
| Bb | 120.29 | 98.97 | 88.98 | 86.19 | 83.02 | 2.75 |
| Bc | 124.99 | 100.38 | 86.75 | 83.74 | 81.84 | 3.31 |
| Bd | 131.63 | 104.38 | 84.54 | 80.35 | 79.67 | 4.16 |
| Be | 135.82 | 103.54 | 83.61 | 80.22 | 76.56 | 4.59 |

ASSESSMENT OF THE RESULTS

It has been found that the images obtained with use of the recording materials according to the invention have an appearance comparable to that of silver halide images and a comparable surface feel. The adhesion of the toner to the surface is good with the recording materials according to the invention, the sheets do not stick to one another, are not electrostatically charged, and provide a uniform transfer of toner with use both of dry toners and also liquid toners.

The invention claimed is:

1. A recording material for electrophotographic printing methods, comprising a support and at least one toner-receiving layer, said toner-receiving layer comprising a gloss pigment having a particle size of at most 100 μm, and a water-dispersible and/or water-soluble binder; and wherein the toner-receiving layer comprises a water-soluble (meth) acrylate/acrylic acid ester copolymer in an amount from 2 to 12% by weight, based on the mass of the dried layer.

2. The recording material according to claim 1, wherein the gloss pigment has an oil absorption of 60 to 120 g/100 g of pigment (measured in accordance with EN ISO 787-5).

3. The recording material according to claim 1, wherein the gloss pigment has a particle size from 5 to 60 μm.

4. The recording material according claim 1, wherein the water-dispersible binder is an ethylene acrylate polymer and/or an ethylene acrylate copolymer.

5. The recording material according to claim 1, wherein the water-soluble binder is a polyvinyl alcohol.

6. The recording material according to claim 1, wherein the quantitative proportion of gloss pigment/binder is 40:60 to 60:40.

7. The recording material according to claim 1, wherein the toner-receiving layer contains an electroconductive substance.

8. The recording material according to claim 7, wherein the electroconductive substance is a finely divided electroconductive pigment.

9. The recording material according to claim 7, wherein the electroconductive component is an electroconductive polymer.

10. The recording material according to claim 7, wherein the amount of electroconductive substance in the toner-receiving layer is 0.05 to 4.0% by weight, based on the mass of the dried layer.

11. The recording material according to claim 1, wherein the support is a resin-coated base paper.

12. The recording material according to claim 1, wherein the gloss pigment has a particle size from 5 to 60 μm, wherein the water-dispersible binder is an ethylene acrylate polymer and the water-soluble binder is a polyvinyl alcohol.

13. The recording material according to claim 2, wherein the gloss pigment has a particle size from 5 to 60 μm.

14. The recording material according to claim 13, wherein the water-dispersible binder is an ethylene acrylate polymer and the water-soluble binder is a polyvinyl alcohol.

15. A recording material for electrophotographic printing methods, comprising a support and at least one toner-receiving layer, said toner-receiving layer comprising a gloss pigment having a particle size of at most 100 μm, and a water-dispersible and/or water-soluble binder; wherein said toner-receiving layer contains an electroconductive substance, and wherein the electroconductive component is an electroconductive polymer.

* * * * *